（12） United States Patent
Kolluri et al.

(10) Patent No.: US 6,378,931 B1
(45) Date of Patent: Apr. 30, 2002

(54) MOLDED PLASTIC AUTOMOTIVE WINDOW PANEL AND METHOD OF INSTALLATION

(75) Inventors: Prakash Kolluri, Novi; Mark M. Matsco, South Lyon, both of MI (US)

(73) Assignee: Exatec, LLC., Wixom, MI (US)

( * ) Notice: Subject to any disclaimer, the term of this patent is extended or adjusted under 35 U.S.C. 154(b) by 0 days.

(21) Appl. No.: 09/697,671

(22) Filed: Oct. 26, 2000

Related U.S. Application Data
(60) Provisional application No. 60/162,607, filed on Oct. 29, 1999.

(51) Int. Cl.[7] .................................................. B60J 1/10
(52) U.S. Cl. .................... 296/146.15; 296/201; 296/90; 52/208; 52/204.63; 52/204.69; 52/204.7
(58) Field of Search ....................... 296/146.14, 146.15, 296/201, 90; 52/208, 204.63, 204.69, 204.7

(56) References Cited

U.S. PATENT DOCUMENTS

| | | | | |
|---|---|---|---|---|
| 4,700,525 A | * | 10/1987 | Nieboer et al. ........... 52/208 X |
| 5,142,834 A | * | 9/1992 | Laclave et al. ................ 52/208 |
| 5,205,095 A | * | 4/1993 | Kessler ........................ 52/208 |
| 5,551,197 A | * | 9/1996 | Repp et al. .......... 52/204.69 X |
| 5,773,077 A | * | 6/1998 | Edmond ...................... 427/155 |
| 5,851,045 A | * | 12/1998 | Muramatsu ............. 296/201 X |
| 6,101,772 A | * | 8/2000 | Leonard et al. .......... 52/208 X |
| 6,216,417 B1 | * | 4/2001 | Morin et al. .............. 52/208 X |

* cited by examiner

Primary Examiner—Stephen T. Gordon
Assistant Examiner—Lori L. Coletta
(74) Attorney, Agent, or Firm—John R. Benefiel

(57) ABSTRACT

A molded plastic window panel and method for locating and guiding the window panel to a final position in a window opening in an automotive vehicle body structure, with locator guide features molded integrally in a window panel perimeter portion projecting toward corresponding complementary locator guide features on the body structures. The perimeter portion may be molded as an outer piece separate from a main transparent section with the locator guide features integral therewith, the outer piece bonded to the main section to form a unitary panel. The outer piece may be molded from an opaque plastic to provide a masking black out border and an adhesive joint used to permanently mount the window panel in the body structure window opening. The locator guide features may comprise resiliently deflectable elements such as fingers or tabs on one part engaging complementary features on the other part to urge the window panel into a properly located position on the body structure.

7 Claims, 4 Drawing Sheets

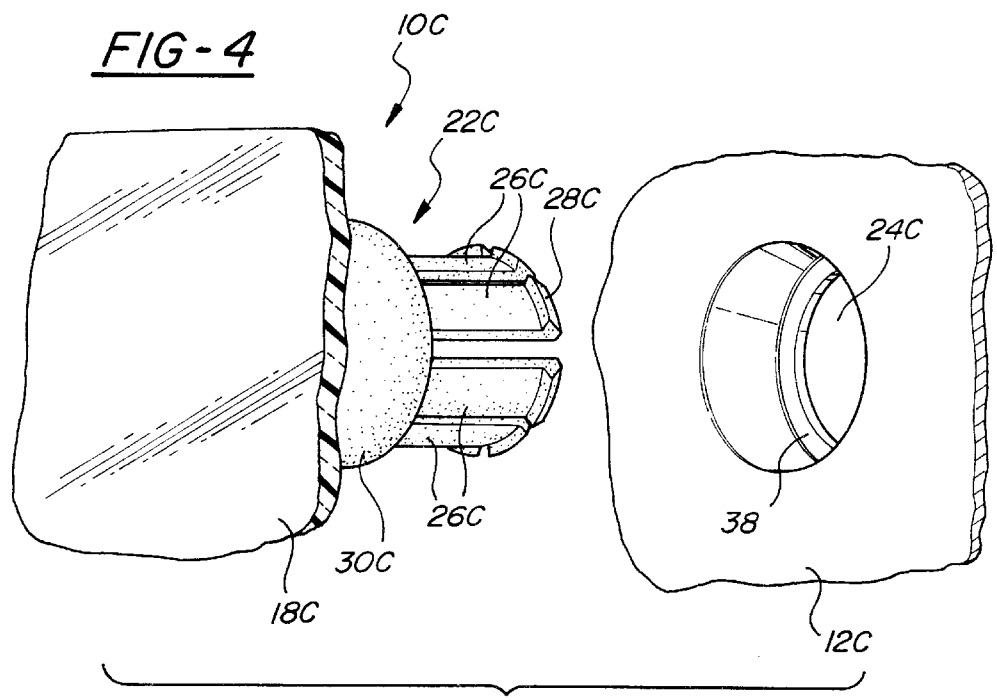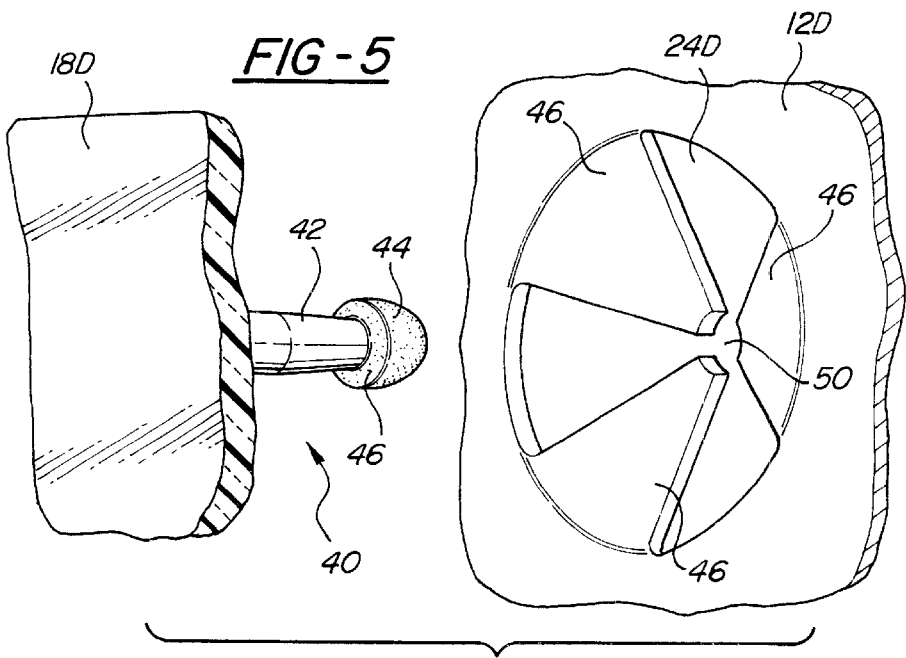

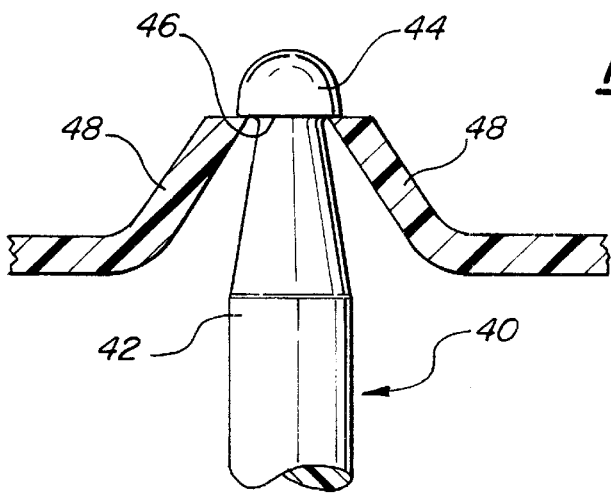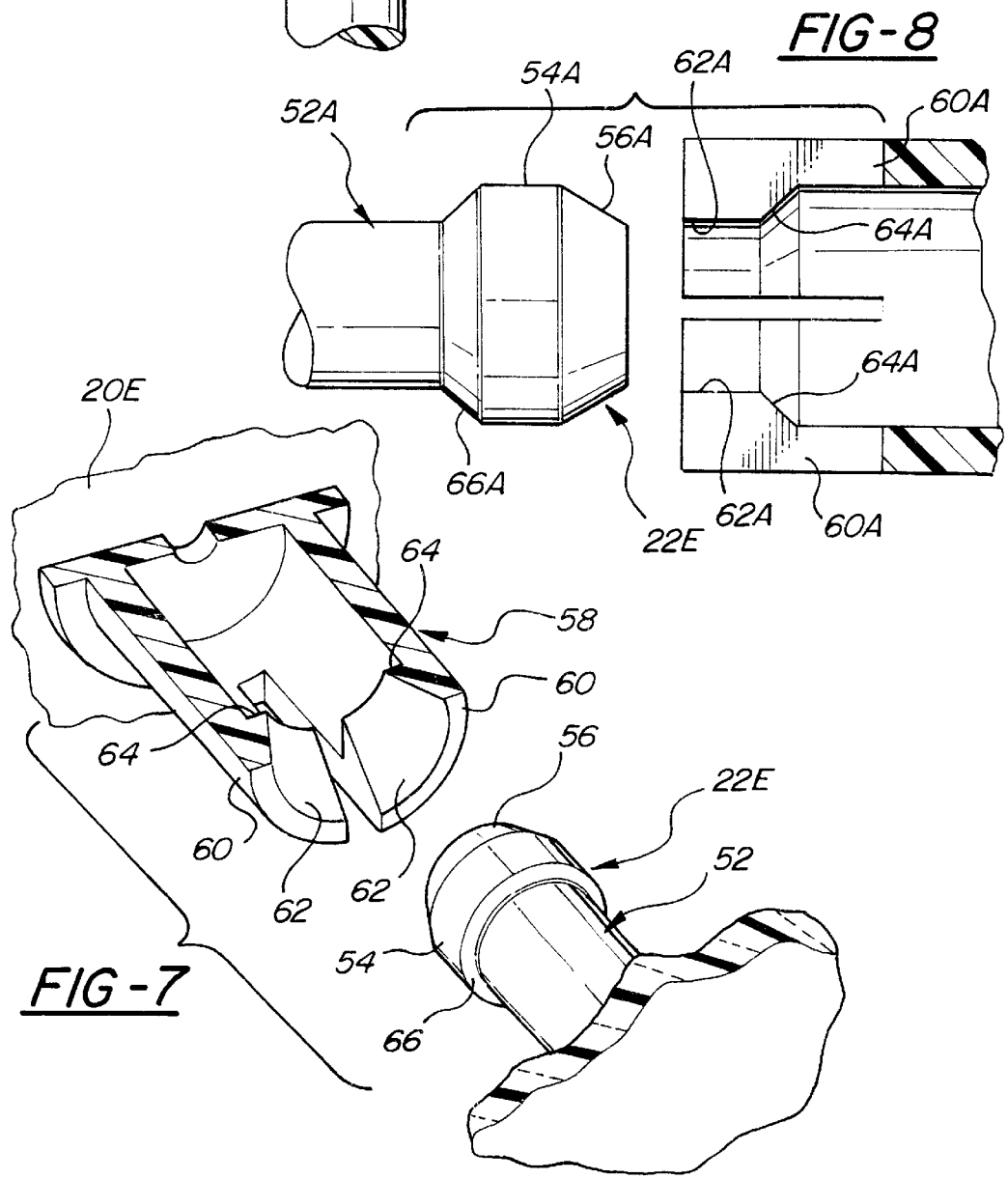

MOLDED PLASTIC AUTOMOTIVE WINDOW PANEL AND METHOD OF INSTALLATION

CROSS REFERENCE TO RELATED APPLICATIONS

This application claims the benefit of the filing date of provisional application 60/162,607, filed on Oct. 29, 1999.

BACKGROUND OF THE INVENTION

This invention concerns the installation of fixed window panels into window openings in the body structure of automotive vehicles which fixed window panels are typically secured by an adhesive joint to body structure surrounding the window opening. Such installation advantageously has requires locator features to properly position the window panel in the opening at assembly. Glass glazing panels have traditionally been used in automotive glazing, and separate locator hardware is added to the glass panel for use in the assembly process.

It is advantageous to be able to guide window panels into position during assembly, and to support the panel in a located position to simplify the assembly process.

The use of molded plastic window panels for automotive glazing has long been proposed. The development of hard coatings to improve scratch resistance has rendered the use of molded plastic panels practical, such that the weight reduction, improved safety, and advantages of styling design freedom could be realized.

It is the object of the present invention to provide locators for molded plastic window panels to simplify the assembly into automotive vehicles.

SUMMARY OF THE INVENTION

The above recited object of the invention, as well as others which will become apparent upon a reading of the following specification and claims, are achieved by molding locator guide features into a molded plastic window panel, the features guiding the window panel into a final position, and supporting the panel in that final position, to thereby facilitate the assembly process.

The window panel is preferably molded in a two shot process with the window panel molded separately from the locator guide features which are integral therewith. The locator guide features are disposed about the perimeter of the window panel, and may be molded as a part of an outer piece surrounding and bonded to a main window panel section.

The locator guide features can take various forms, including a set of projecting fingers which are each resiliently deflectable as they are moved into a respective receiving hole in the body structure, the spring force exerted by the fingers laterally guiding the window panel into its final position in the body structure window opening.

Alternatively, the post features can be guided by engagement with an array of deflectable tabs surrounding a respective hole in the body structure.

Positive stop surfaces are provided to set the spacing of the main panel section with respect to the window frame.

DESCRIPTION OF THE DRAWING FIGURES

FIG. 4 is a perspective view of a second embodiment of the window panel incorporating a second form of integral locating guide feature, showing a portion of the automotive body structure.

FIG. 5 is a perspective fragmentary view of another embodiment of the window panel according to the invention with a fragmentary portion of a separated body structure to be mated with one of the locator guide features.

FIG. 6 is a fragmentary side view of the locator guide feature of the window panel embodiment of FIG. 5 with a sectional view of the body structure, in the final position of the window panel.

FIG. 7 is a side view of another embodiment of the locator guide feature and a separated body mounted mating feature in partial section.

FIG. 8 is a perspective view of a window panel having the integral locator guide feature of FIG. 7, with a perspective view of the body feature in section.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
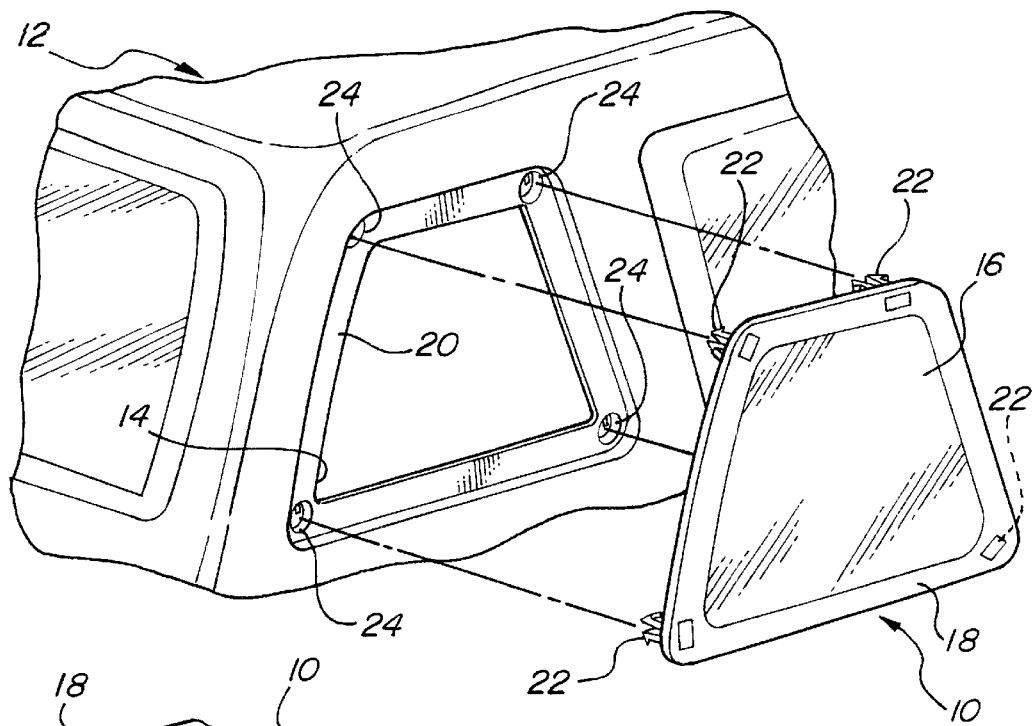
FIG. 1 is a perspective fragmentary view of a vehicle body with a separated window panel according to the present invention.

FIG. 1 shows a window panel 10 to be assembled to an automotive vehicle body structure 12, in a window opening 14 defined in the body structure 12.

The window panel 10 includes a transparent main piece 16 molded from a suitable plastic such as polycarbonate which has been hardcoated in the well known manner to improve scratch resistance.

A perimeter area 18 is masked by an opaque coating to conceal the underlying constructional details, such as the adhesive-seal joint. A plurality of integral locator guide features 22 project rearwardly from the inside of the perimeter area 18.

Each locator guide feature 22 is aligned in correspondence with a bifurcated hole 24 formed in the body structure 12.

Figure 2:
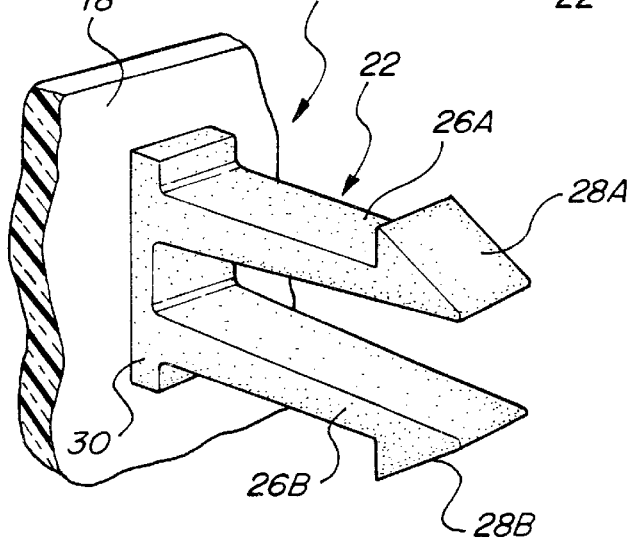
FIG. 2 is an enlarged fragmentary revenue view of a portion of the window panel shown in FIG. 1 showing a first form of the integral locator guide features according to the invention.

FIG. 2 shows that each locator guide feature 22 comprises a pair of laterally and resiliently deflectable fingers 26A, 26B, each having inclined cam surfaces 28A, 28B formed on the end thereof.

As the window panel 10 is advanced towards the holes 24, the fingers 26A, 26B of each feature 22 engages an edge of the bifurcated holes 24, causing lateral deflection of the fingers 26A, 26B to generate an aligning force tending to guide the window panel 10 into a final aligned position in the opening 14.

The deflectable fingers 26A, 26B are integral with a base portion 30 which in turn is integral with the perimeter area 18.

Figure 3:
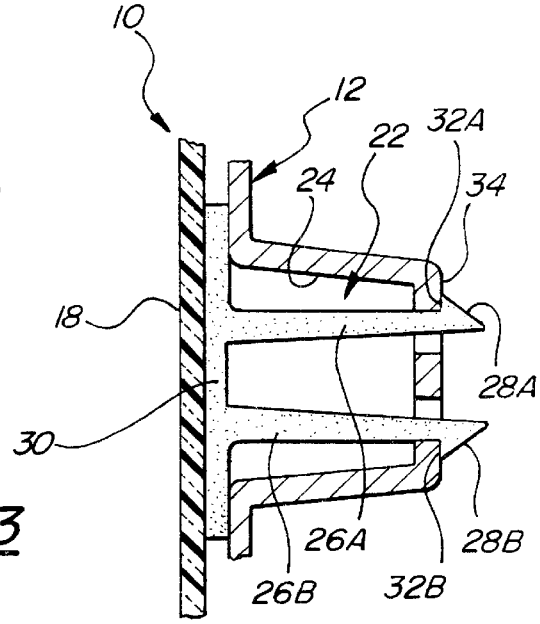
FIG. 3 is a view of a section taken through the window panel and body structure showing the window panel in its final position.

The base portion 30 moves into abutment with the body structure 12 adjacent the bifurcated holes 24 to act as a positive stop in the fully seated position with a predetermined clearance space with the body structure 12, as shown in FIG. 3.

An undercut 32A, B on the end of the deflectable fingers 26A, 26B engages a surface 34 adjacent the bifuircated holes 24 to retain the window panel 10 in its final position. An adhesive can be employed to form a permanent mounting in the manner well known in the art.

The locator guide feature 22 is formed integrally with the window panel 10, as by a "second shot" molding step to be melt bonded thereto.

Figure 3A:
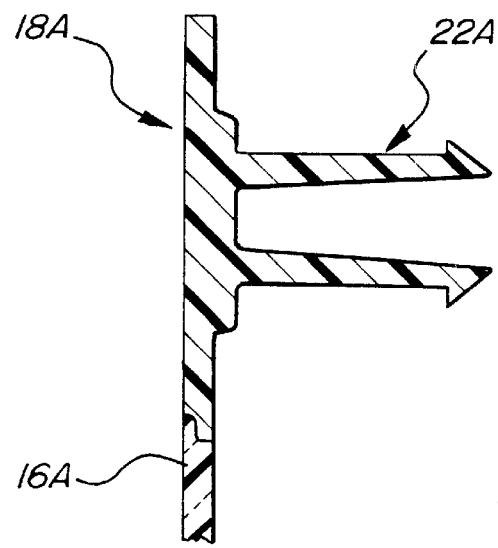
FIG. 3A is a sectional view of an alternate form of window panel construction incorporating the guide locator feature shown in FIG. 3.

FIG. 3A shows an advantageous construction in which the perimeter portion 18A and guide locator feature 22A are molded in one piece from an opaque plastic resin, separately from the main section 16A molded from a transparent plastic. The perimeter portion 18A is bonded to the main section 16A as by a melt bond or using an adhesive.

This approach produces an opaque masking border without the need for painting or imprinting a masking black out, as described in detail in copending patent application 60/160,113, filed on Oct. 18, 1999, and utility application Ser. No. 09/691,622, filed on Oct. 18, 2000, assigned to the same assignee as the present application.

Figure 4A:
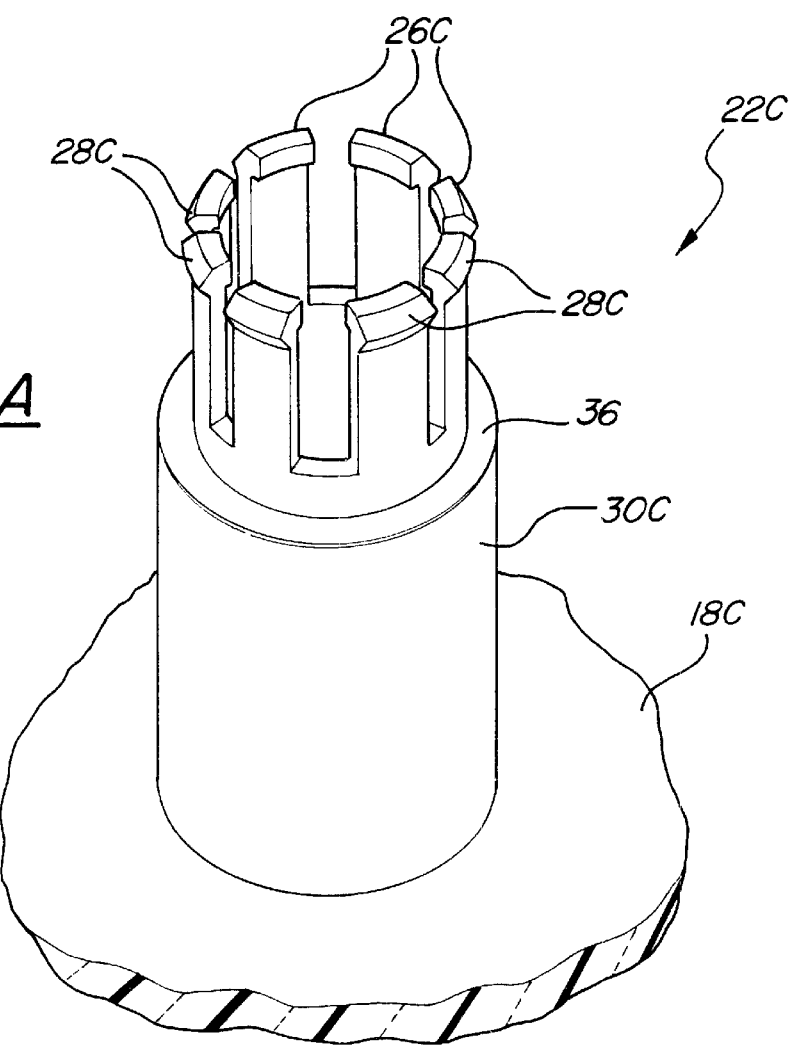
FIG. 4A is an enlarged perspective view of a fragmentary portion of the window panel shown in FIG. 4 showing one of the integral locator guide features.

FIGS. 4 and 4A show another embodiment of the invention, in which a guide locator guide feature 22C takes the form of a cylindrical array of resiliently deflectable fingers 26C integral with a cylindrical base 30C, in turn integral with the perimeter 18C of a window panel 10C.

The fingers 26C resiliently deflect inwardly when contacting the edge of a hole 24C on body structure 12C to guide the window panel into a final position.

A shoulder 36 provides a positive stop against an end face 38 of the body structure 20C adjacent the mating hole 24C.

Sloping end faces 28C and undercuts 32C are provided as in the first described embodiment for the same purpose.

FIGS. 5 and 6 show another embodiment of the locator guide feature 40 in which projecting posts 42 are integral with the perimeter portion 18D. A rounded head 44 has an undercut 46.

The posts 42 are aligned with respective holes 24D in the body structure 12D. A series of radially extending wedge shaped deflectable tabs 48 converge to define a small opening 50. As each post 42 advances into a respective hole 24D, deflection of the tabs 48 exerts a guiding force urging the post to the center of the hole 24D.

The tabs 48 resiliently deflect sufficiently to allow the head 44 to move through the smaller opening 50 and be captured by engagement of the undersurface 46 against the ends of the tab 48 is shown in FIG. 6.

FIG. 7 shows yet another embodiment of the locator guide features 22E in which a post 52 has a plug-shaped end 54 with a convergent tip surface 56.

A tubular piece 58 projects from the body structure 12E, the end thereof divided to form outwardly deflectable segments 60, each having sloping inner surfaces 62.

An undercut 64 on each segment 60 mates with an undercut 66 on the post 52 after full insertion.

FIG. 8 shows a variation in which the post 52A has a sloping surface 56A on the tip 54A.

The segments 60A have straight sided surfaces 62A and a sloping rear surface 64A mates with a sloping rear surface 66A.

This allows easier removal after assembly.

What is claimed is:

1. An automotive glazing installation for a window opening in an automotive body structure comprising:

a generally planar main panel piece constructed of a transparent plastic;

an outer perimeter piece of molded plastic extending about said main panel piece and unitary therewith;

at least one locator guide feature integrally formed on said outer perimeter piece and projecting from a rear face of said outer perimeter piece;

a corresponding locator guide feature on said automotive body structure configured to receive said locator guide feature projecting from said outer perimeter piece;

one of said locator guide features comprising a cylindrical array of resiliently and radially deflectable fingers and the other locator guide feature on comprising a hole able to receive said cylindrical array of resiliently and radially deflectable fingers.

2. The installation according to claim 1 wherein said outer perimeter piece is molded from an opaque plastic and bonded to said main panel piece.

3. The installation according to claim 1 wherein each of said deflectable fingers has a sloping end surface engagable with an edge of said hole.

4. The installation according to claim 3 wherein said deflectable fingers further include an undercut behind said sloping end surface captured by a portion of said automotive body structure adjacent said hole after said plurality of deflectable fingers pass into said hole.

5. An automotive glazing installation for a window opening in an automotive body structure comprising:

a generally planar main panel piece constructed of a transparent plastic;

an outer perimeter piece of molded plastic extending about said main panel piece and unitary therewith;

at least one locator guide feature integrally formed on said outer perimeter piece and projecting from a rear face of said outer perimeter piece, a corresponding locator guide feature on said automotive body structure configured to receive said locator guide feature projecting from said perimeter piece;

one of said locator guide feature on said outer perimeter piece comprising a projecting post, and said other locator guide feature comprising an array of deflectable elements adapted to be resiliently separated to accommodate a tip of said post.

6. The installation according to claim 5 wherein said deflectable elements comprises a series of radially convergent tabs defining an opening smaller than said tip of said post, said tabs resiliently deflectable to receive said post into said opening.

7. The installation according to claim 5 wherein said deflectable elements comprise segments of a slotted tube affixed to said automotive body structure.

* * * * *